(12) United States Patent
Swenson et al.

(10) Patent No.: US 7,529,847 B2
(45) Date of Patent: May 5, 2009

(54) ACCESS TO AUDIO OUTPUT VIA CAPTURE SERVICE

(75) Inventors: Steven E. Swenson, Redmond, WA (US); Alper Selcuk, Redmond, WA (US); James H. Dooley, IV, Bellevue, WA (US); David W. Flenniken, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 10/393,664

(22) Filed: Mar. 20, 2003

(65) Prior Publication Data

US 2004/0186911 A1 Sep. 23, 2004

(51) Int. Cl.
*G06F 15/16* (2006.01)
(52) U.S. Cl. .................. 709/231; 709/235
(58) Field of Classification Search .......... 709/231, 709/246; 379/2
See application file for complete search history.

(56) References Cited

U.S. PATENT DOCUMENTS

| | | | |
|---|---|---|---|
| 4,677,466 A * | 6/1987 | Lert et al. ............. | 725/22 |
| 5,689,130 A * | 11/1997 | Okabe et al. ............. | 257/342 |
| 7,068,711 B2 * | 6/2006 | Huang et al. ............. | 375/219 |
| 2002/0172352 A1 * | 11/2002 | Mecayten ............. | 379/406.01 |
| 2003/0056213 A1 * | 3/2003 | McFaddin et al. ............. | 725/32 |

* cited by examiner

*Primary Examiner*—John Follansbee
*Assistant Examiner*—Dhairya A Patel
(74) *Attorney, Agent, or Firm*—Lee & Hayes, PLLC

(57) ABSTRACT

An operating system has an audio system service that can capture all of the streaming audio destined for an output device and make it available for processing. An application can perform the processing upon the captured streaming audio. Any streaming audio that is output by the application and destined for a render device can also be captured for signal processing prior to being mixed with other streaming audio destined for the output device.

2 Claims, 11 Drawing Sheets

ACCESS TO AUDIO OUTPUT VIA CAPTURE SERVICE

TECHNICAL FIELD

This invention generally relates to streaming audio processing and, more particularly, to streaming audio recording and rendering components of an operating system.

BACKGROUND

Computing systems, such as the personal computer (PC), are increasingly being used for recording and playing back of streaming audio. One such application is network telephony in which users of respective PCs can talk to one another over a packet switched network, much as a telephone user talks to another telephone user over a circuit switched network. One such network telephony application is a real time communications application (RTC), such as instant messaging. While the RTC is executing, each user speaks into a local microphone at a PC and hears the voice of the remote party on a local speaker.

A difficulty can arise in the RTC in that sounds being output at each PC can include an unpleasant echo. For instance, an echo can be heard when the remote voice being received at one PC is played out of the local speaker and then input into the local microphone. This results in the remote voice being output a second time at the local speaker which is heard as an echo.

Another difficulty can arise in the RTC in that sounds produced by one PC, such a beeps, clicks, and other audible cues produced by applications being executed, are input into the local microphone. These sounds, which are of importance only to the local user, are then transmitted over the network to the remote party where they are heard after being output at the remote speaker.

The foregoing two difficulties can be solved by an acoustic echo cancellation process (AEC) that is performed upon a mix of all of the audio streams that are to be output from a PC (e.g., the global output). AEC is one of many processes that can be performed upon audio streams using signal processing techniques. Some signal processing techniques can be performed by mechanisms that form parts of an operating system of a PC. Some of these operating system mechanisms are those that can be used for rendering (or playback) of audio streams and for capturing (or recording) of audio streams. Known operating system mechanisms used for rendering and capturing are completely separate and are often implemented in wholly independent systems. Moreover, known operating system mechanisms for signal processing, such as for AEC, are difficult to use and understand due to poor architecture.

Given the foregoing, it would be an advantage in the art to provide a simple and easily understood operating system mechanism to capture a mix of all audio streams that are to be output from a PC (e.g., the global output). When so captured, an application executing on a PC would be able to perform signal processing upon the global output so as to accomplish a desired acoustic result.

SUMMARY

An audio system service within an operating system captures all of the streaming audio destined for an output device and makes it available for processing. A local client, such as an application, can perform the processing upon the captured streaming audio. Additionally, the streaming audio output by an application destined for a render device can also be captured for signal processing prior to being mixed with other streaming audio destined for the output device.

BRIEF DESCRIPTION OF THE DRAWINGS

The detailed description is described with reference to the accompanying figures in which the same numbers are used throughout the disclosure and figures to reference like components and features. Series 100 numbers refer to features originally found in FIG. 1, series 200 numbers refer to features originally found in FIG. 2, and series 300 numbers refer to features originally found in FIG. 3, and so on.

DETAILED DESCRIPTION

This invention allows an application to obtain a system-wide global mix of audio streams (global output). The global output is obtained using a capturing (or recording) component of the audio services of an operating system. The operating system also has a rendering component. Rather than being separate independent systems, both the capturing and rendering (or playback) components are integral to the operating system.

In some implementations, an application calls for the capturing component to capture the global output from an output device by opening a capture stream on a playback device. To do so, the capturing component opens a capture source from an output device to obtain the global output. The application then has the global output for further processing.

In a real time communications application (RTC) implementation, the RTC calls for the rendering component to open on an output device and for the capturing component to open on an input device. As such, the RTC effectively has an output device open with a rendering interface and an input device open with a capturing interface. The RTC can then call for the opening of the capturing component on the output device. When the global output from the output device is returned to the RTC, audio streams that would otherwise cause acoustic echoes can be canceled by the RTC from the global output of the output device. In other implementations, an application calls for the opening of the capturing component on the rendering component for the application (local output). The captured output from the rendering component can be passed back to the application for subsequent signal processing.

Figure 1A:
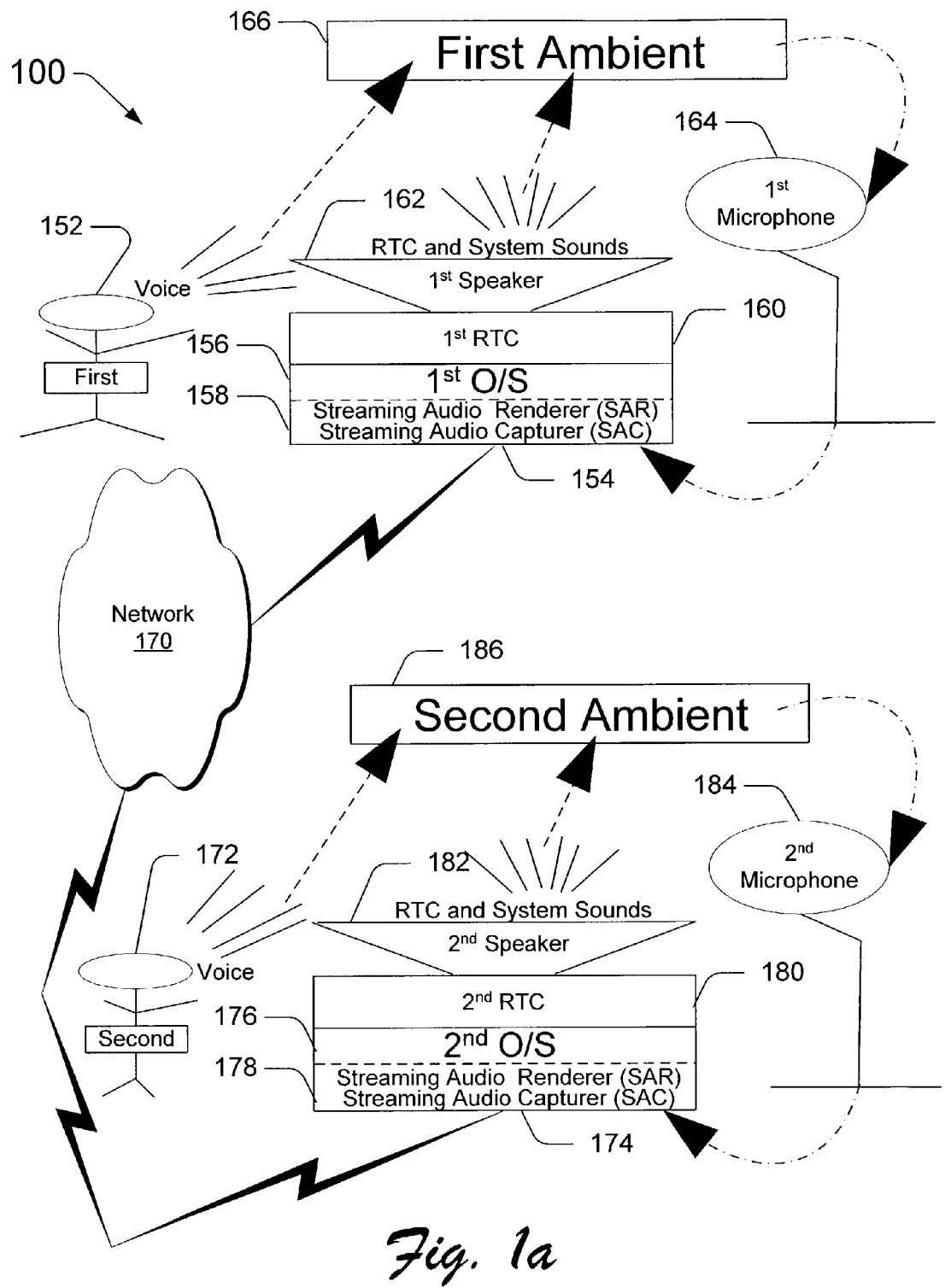
FIG. 1*a* shows a network telephony environment in which a first person talks to a second person over a network using respective personal computers (PC), each executing a real time communication application (RTC).

FIG. 1a depicts a personal computer (PC) network telephony environment 100 in which a first person 152 has a telephone conversation with a second person 172 over a packet switched network 170 using respective PCs 154, 174. Each PC 154, 174 is operated, respectively, by an operating system 156, 176 and executes an RTC. Each PC 154, 174 has, respectively, one or more microphones 164, 184 that receive input from the ambient 166, 186, including the respective voices of persons 152, 172. Each PC 154, 174 has, respectively, one or more speakers 162, 182 from which local person 152, 172 hears the voice of the remote person 172, 152 speaking. In addition to hearing the remote person's voice, each person 152, 172 also hears sounds that are made by their respective PCs 154, 174, such as the system sounds that are typical of the PC operating environment (e.g., beeps, clicks, audible cues and diagnostics, etc.)

Ideally, the RTC 160 should communicate only a voice spoken into the microphone over the network to the other person. Also, the RTC 160 should ensure that only the voice that is received should be heard from the speaker of the receiving PC. Without proper processing of streaming audio by the RTC, these ideals will not be realized. For instance, it is important to the RTC 160 that the voice audio stream received from the second PC 174 is prevented from being output more than once at speaker 162, or else person 152 will hear an echo of the voice of person 172. Also, the RTC 160 should ensure that only the voice of the person 152, and not the system sounds from PC 152, are transmitted over network 170 to PC 174.

In order to accomplish the foregoing ideals, an implementation of an RTC 160 can be executed where operating system 156 has a streaming audio capturer (SAC) 158 and a streaming audio renderer (SAR) 158. In this implementation, the RTC 160 of the first system 154 outputs a voice audio stream received from the second system 174 to the SAR 158 that renders the same to the speaker 162 for an output that is input to the microphone 164. The operating system 156 outputs a system sounds audio stream to the SAR 158 that renders the same to the speaker 162 for an output that is input to the microphone 164. The microphone 164 receives an input of an ambient audio stream from the ambient 166 that includes the system sounds audio stream and the voice audio stream received from the second system 174. The RTC 160 then calls for the SAC 158 to capture a local audio stream that includes the voice audio stream received from the second system 174 that is rendered by the SAR 58. The RTC 160 also calls for the SAC 158 to capture a global audio stream that includes the system sounds audio stream that was rendered by the SAR 158.

Given the foregoing, the RTC 160 can perform various cancellations to accomplish the ideals of the RTC. By using the local audio stream captured by the SAC 158, the RTC 160 can cancel the input to the microphone 164 as well as the input of the voice audio stream received from the second system 174 that was rendered by the SAR 158 and output by the speaker 162. As such, the voice audio stream received from the second system 174 is prevented from being rendered more than once by the SAR 158 for output to the speaker 162. By using the global audio stream captured by the SAC 158, the RTC 160 can cancel from the input to the microphone 164 the system sounds audio stream output by the operating system 156 that were rendered by the SAR 158 and output by the speaker 162. As such, the system sounds audio stream is prevented from being transmitted by the RTC 160 to the second system 174 over the network 170.

Figure 1B:
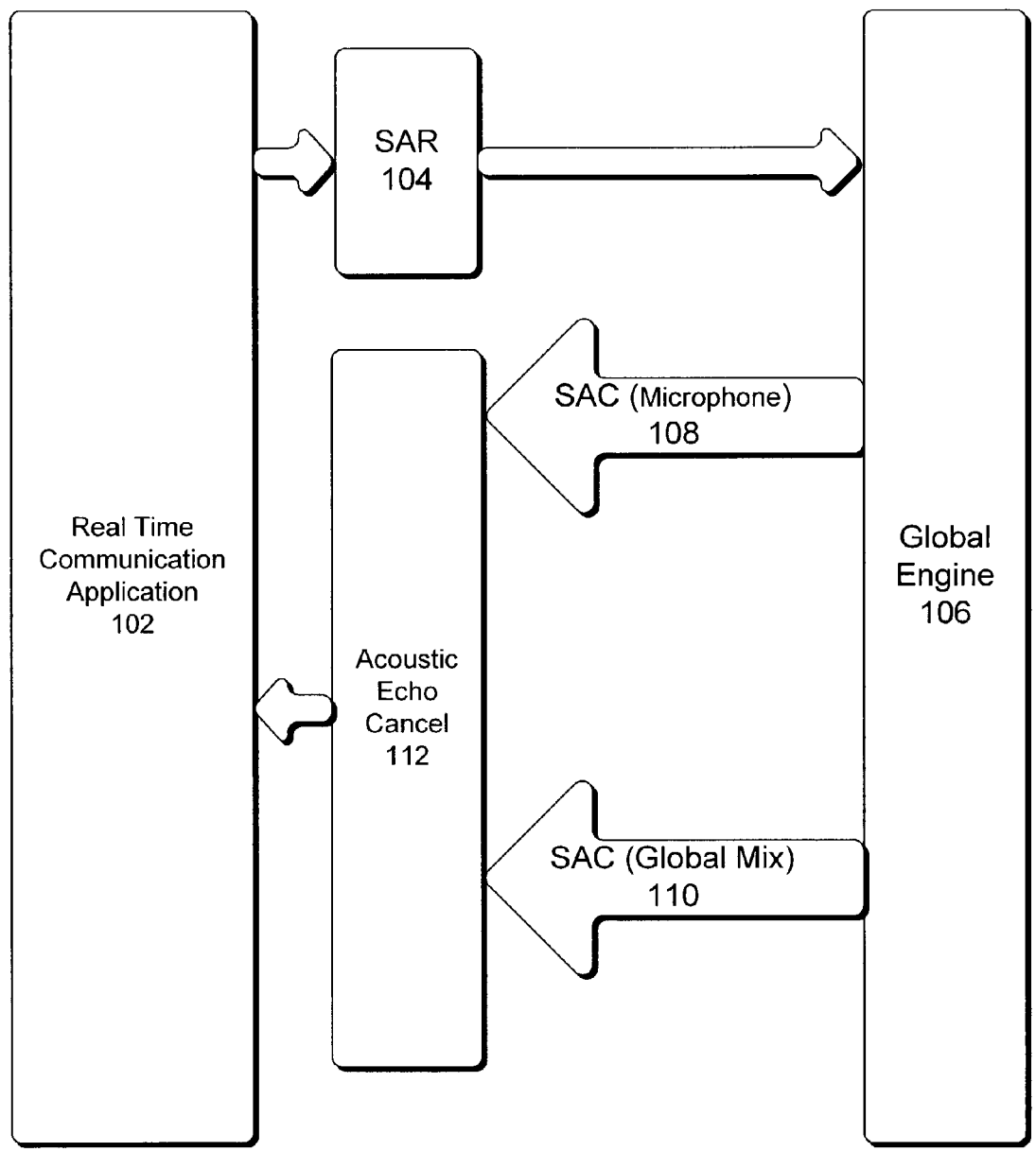
FIG. 1*b* shows a partial block diagram, for the network telephony environment of FIG. 1*a*, that illustrates an RTC that uses streaming audio capturers (SAC) and a streaming audio renderer (SAR) to perform acoustic echo cancellation (AEC).

FIG. 1b shows a partial block diagram that characterizes aspects of the network telephony environment 100 of FIG. 1a. An RTC 102 works in conjunction with an acoustic echo cancellation procedure (AEC) 112. In order to perform the AEC 112, various audio streams can be used including the recorded input from a capture device and either the locally processed audio stream going out a render device or the global audio output system-wide mix (global output) going out a render device. FIG. 1b depicts the environment in which these various audio streams are used.

Figure 2A:
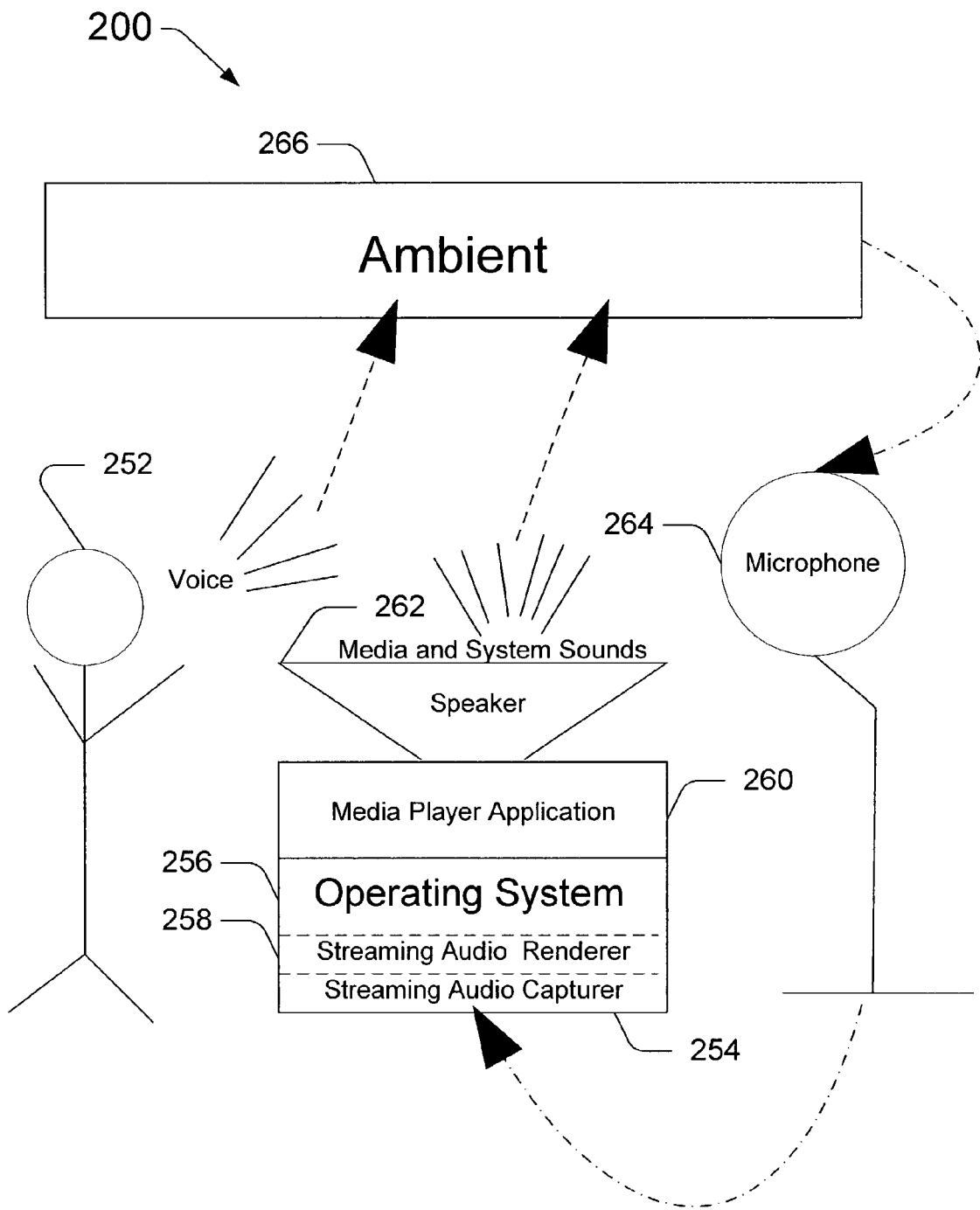
FIG. 2*a* shows a PC having an operating system that includes a SAC and a SAR, where a user gives voice commands to a media player application (MP) being executed by the PC that are input via a microphone to the PC, and where the user listens to sound output by a speaker that originated from the execution of the MP.

In FIG. 1b, the RTC 102 is executing on a computing system that is operated by an operating system having an audio services component. The audio services component can be called by RTC 102 to set up streaming audio capturers (SAC) 108, 110 and a SAR 104. The SAR 104 renders steaming audio from RTC 102 that is output to global engine 106. A microphone (not shown) inputs streaming audio that is captured by SAC 108 and output to global engine 106. Global engine 106 mixes input from the microphone and the SAR 104. The mixture is to be output by an output device. This output is the global output of the output device that is captured by SAC 110. A digital loop back is depicted in FIG. 1b in which the RTC 102 receives back the captured streaming audio from the microphone via SAC 108 and receives back the global output that is captured via SAC 110. RTC 102 can then perform AEC 112 upon the captured global output. Since AEC 112 wants to cancel the captured global output from SAC 110, RTC 102 asks a system audio graph for a connection to the digital loop back of SAC 110. The captured global output is used by the AEC 112 to cancel to the local effect FIG. 2a depicts a media player environment 200 in which a PC 254 can play media at the vocal commands of a person 252. To do so, person 252 speaks into the ambient 266. Sound from ambient 266 is picked up by a microphone 264. Microphone 264 inputs the sound from ambient 266 to PC 254 for voice recognition processing. A media player application (MP) 260 executes on PC 254 and receives voice commands from the voice recognition processing. By way of example, media player 260 can be a Windows® Media Player software as provided by the Microsoft Corporation, of Redmond, Wash., USA. These commands can be to play a song, to pause the playing of a song, to play the next song, to stop playing a song, to eject portable media (e.g., a CD) from a portable media player, etc. MP 260 plays media that is output from a speaker 262.

Ideally, sound that is produced by MP 260 should be prevented from being output more than once by the speaker 262 and the MP 260 should receives only the voice commands and not the system sounds from PC 254. In order to accomplish these ideals, an implementation of MP 260 can be executed on PC 254 using an operating system 256 having an audio service component. The audio service component includes a SAC 254 and a SAR 258. The media player application (MP) 260 outputs a media audio stream to the SAR 258 that renders the same to the speaker 262 for an output that is then input to the microphone 264 from the ambient 266. The operating system 256 outputs a system sounds audio stream to the SAR 258 that renders the same to the speaker 262 for an output that is then input to the microphone 264 from the ambient 266. The microphone 264 receives an input of an ambient audio stream from the ambient 266. Given the foregoing, the ambient audio stream includes the system sounds audio stream output by the speaker 262, the media audio stream output by the speaker 262, and a voice audio stream including vocal commands from the user 252 for operations to be carried out by the MP 260. The MP 260 calls for the SAC 254 to capture from the renderings of the SAR 258 each of a local audio stream that includes the media audio stream and a global audio stream that includes the system sounds audio stream and the media audio stream.

MP 260 can perform various cancellations from the input to the microphone 264. By using the local audio stream captured by the SAC 254, the MP 260 cancel the input of the media audio stream so that the media audio stream is prevented from being output more than once by the speaker 262. By using the global audio stream captured by the SAC 254, the MP 260 can cancel the input of the system sounds audio stream and the media audio stream so that the MP 260 receives only the voice audio stream.

Figure 2B:
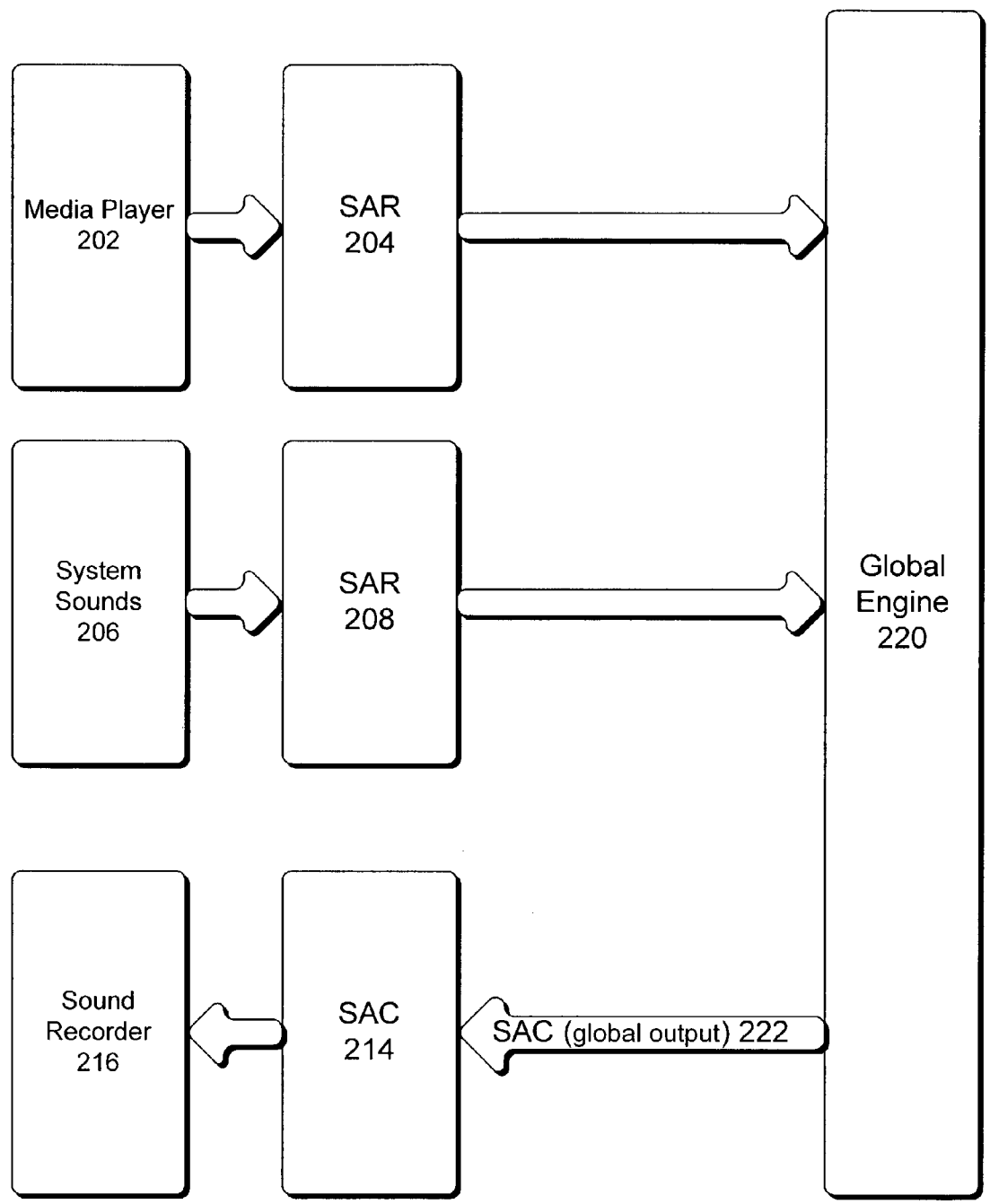
FIG. 2*b* shows a partial block diagram, for the PC in FIG. 2*a*, that illustrates system sounds from the PC and media sounds from a MP, where the streaming audio from each are input to respective SARs for mixing and processing in a global engine, and where the output from the global engine is output to a SAC for recording with a sound recorder.

FIG. 2b shows a partial block diagram that characterizes aspects of the media player environment 200 of FIG. 2a. A media player 202 is executing on a computing system that is operated by an operating system having an audio services component. The audio services component can be called by media player 202 to set up a SAC 214 and SARs 204, 208. Media player 202 is outputting to SAR 204. System sounds 206 are being produced by the computing system for output to a SAR 208. Streaming audio from MP 202 and system sounds 206 are being rendered to a global engine 220 where they are mixed to produce a global output. The global output is captured by SAC 214 for recording by a sound recorder 216. The streaming audio in the sound recorder 216 can be used for signal processing to accomplish desired acoustic results, such as the ideals for MP 206 seen in FIG. 2a.

Figure 3:
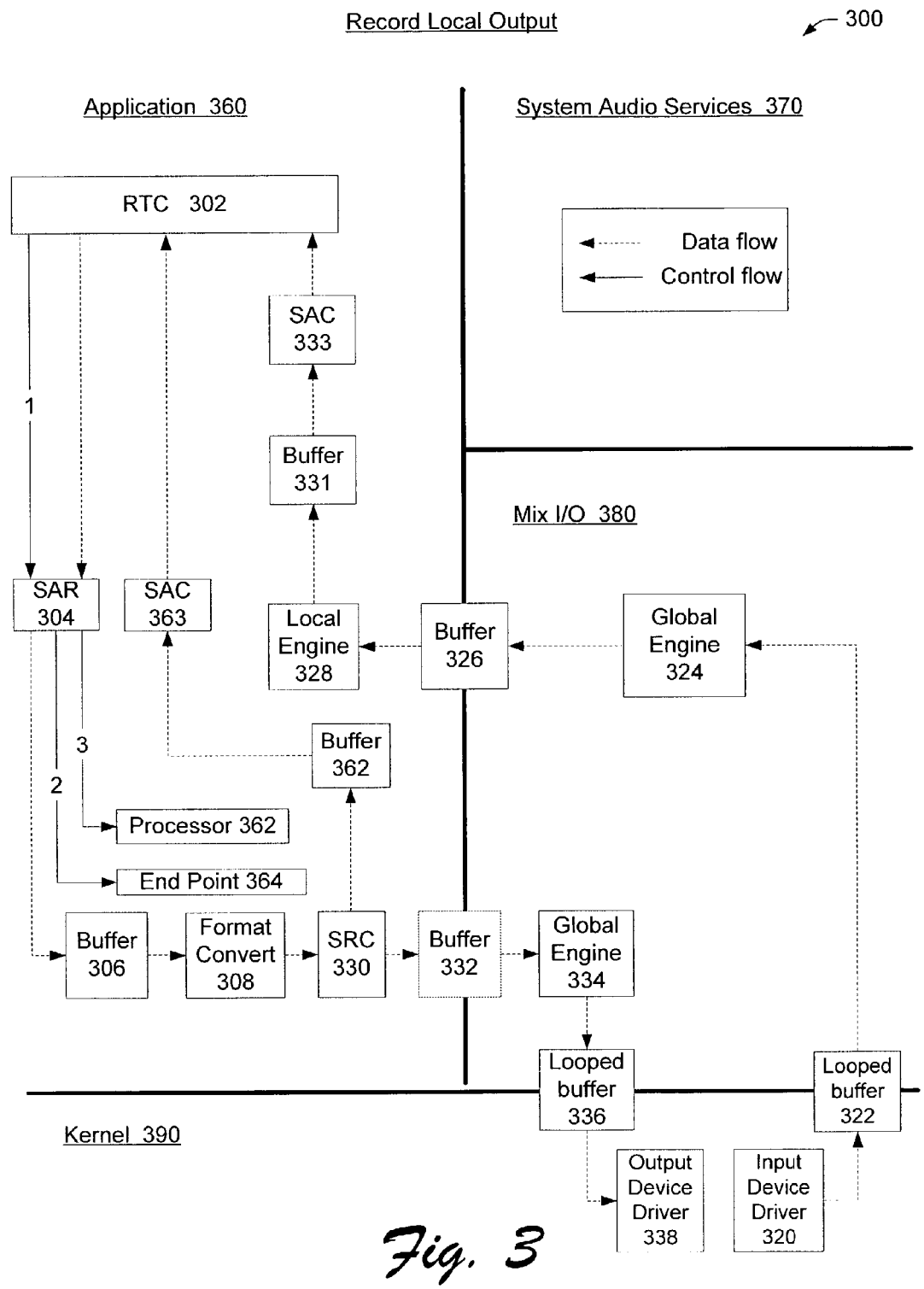
FIGS. 3-5 shows respective implementations in which an RTC is executing in a computer system having an operating system with a SAR open on an output device and a SAC open on an input device, where the SAR and SAC are used to cancel output from that of the RTC rather than to cancel output from the global output.
Figure 4:
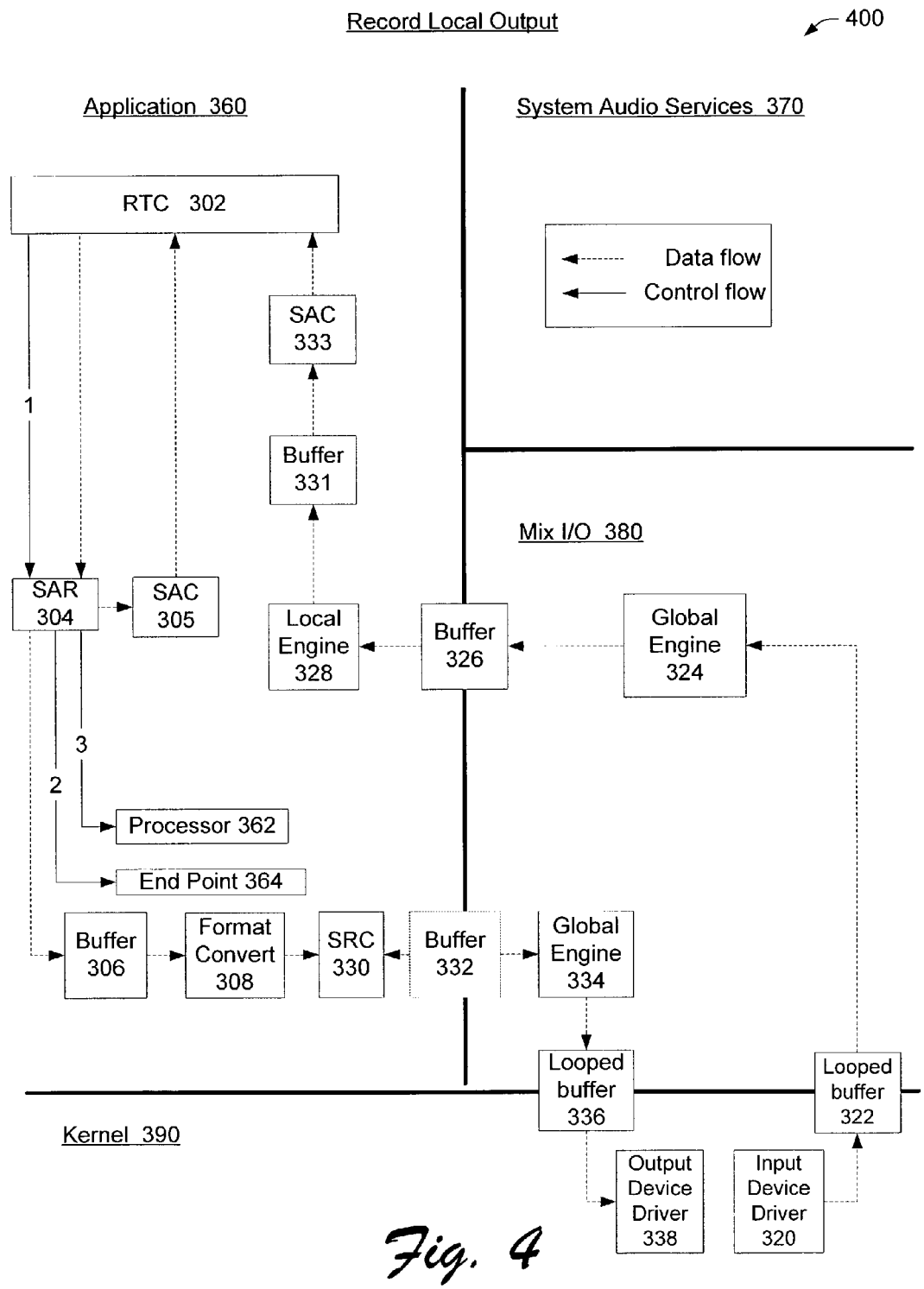
Figure 5:
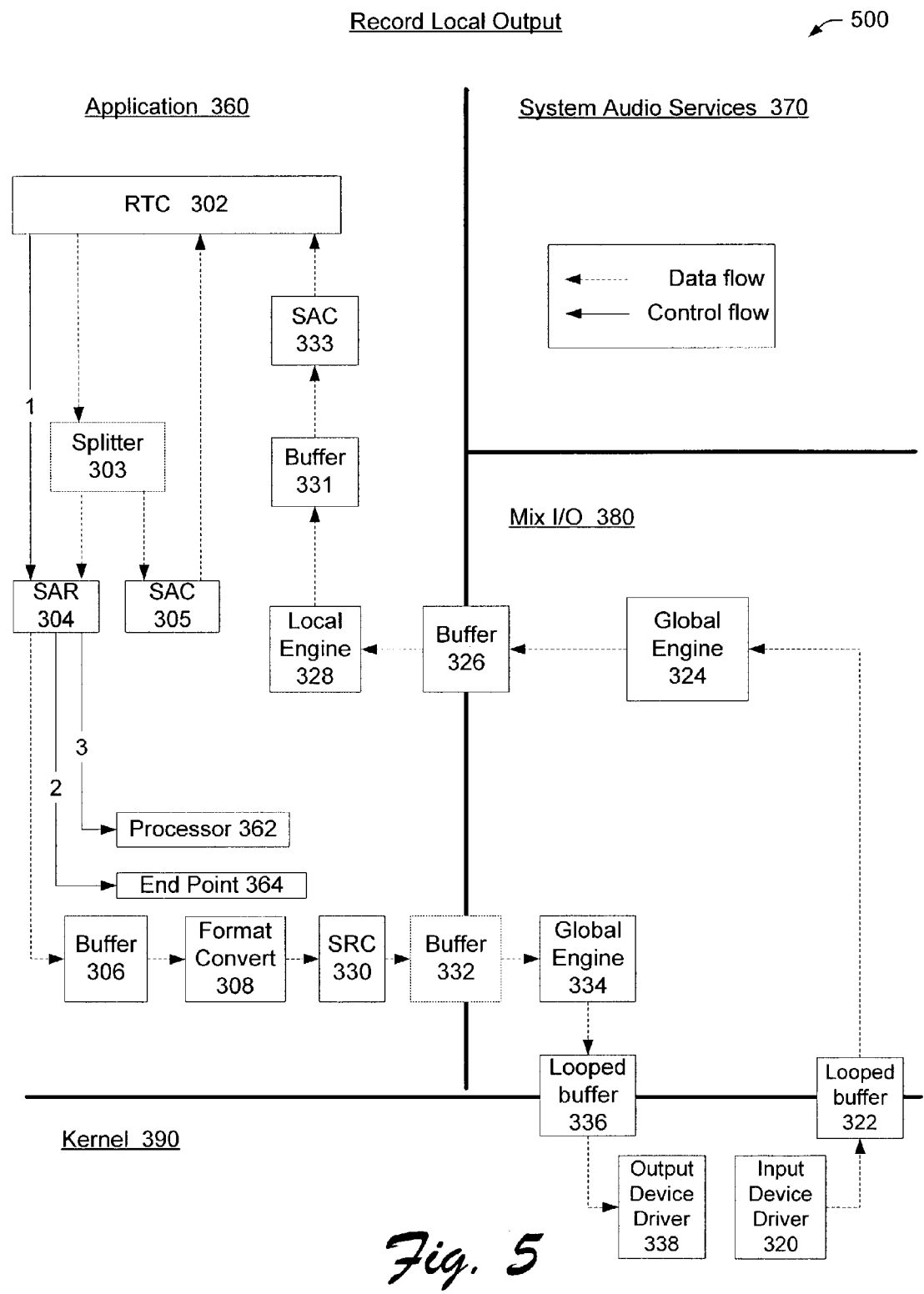

FIGS. 3-5 show respective environments 300, 400 and 500 that feature an RTC that calls for the opening of a capturing application program interface (API) on an already existing rendering API so that the RTC output mix can be optionally subjected to advanced signal processing, such as AEC.

FIG. 3 shows an environment 300 in which an RTC 302 is in a digital loop back circuit between an output device in communication with an output device driver 338 and an input device in communication with an input device driver 320. Environment 300 shows several sections that are delimited by the darker lines and include an application section 360, a system audio services section 370, a mix input/output (I/O) section 380, and a kernel section 390. Application section 360 is serviced by systems services section 370. Mix I/O section 380 receives input from an input device and outputs to an output device via respective drivers 338, 320. In environment 300, RTC 302 is canceling only the output from a local process rather than canceling the output from all of a global output.

RTC 302 has a SAR 304 open on output device driver 338 and a SAC 333 open on input device driver 320. In FIG. 3, solid arrows reflect the flow of control and dashed arrows indicate data flow. A control flow indicated with reference numeral '1' begins when RTC 302 passes a control flow instruction to SAR 304 to begin a process that is illustrated in environment 300. The control flow arrow at reference numeral '1' is intended to illustrate the concept that RTC 302 can call or request for the recording of the output from RTC 302. During this control flow, RTC 302 makes a request of the system audio services 370 to open up an output with an interface to a SAC 363. Most of the structure is set up in environment 300 by system audio filter graph manager 372. The RTC 302 calls the SAR 304 for the purpose of getting a SAC interface from SAR 304. In this case, SAC 363 is the interface called by RTC 302. As such, RTC 302 has a data flow to SAR 304. SAR 304 outputs to buffer 306.

Control flows indicated with reference numerals '2' and '3' pass from SAR 304 respectively to a processor 362 and to an end point 364. Processor 362 is intended to represent a name of an object that maintains a list of audio effects that are to be processed, where the object calls for these effects to be processed. The control flow arrows at reference numerals '2' and '3' reflect a possible arrangement for what the application program interface (API) of SAR 304 could coordinate the recording of the output from RTC 302.

Data flows from buffer 306 for a format conversion process at reference numeral 308. Following the format conversion at reference numeral 308, data flows to a sample rate converter (SRC) 330. SRC 330 is the last acoustic effect module seen in FIG. 3 before data flows to Mix I/O section 380.

At SRC 330, the data is subject to a sample rate conversion. From SRC 330, data flows in two different directions. One of these directions is a data flow from buffer 362 to a SAC 363. At SAC 363, data is captured and returned to RTC 302 as an input. As such, RTC 302 has received local output that has been captured from a local process. Accordingly, RTC 302 has received a capture API instance back and receives a delivery of output data as input in the data flow arrow extending from SAC 363 to RTC 302. In the other direction, SRC 330 outputs the same data to a buffer 332 as was output to the buffer 362. The data in buffer 332 is submitted to a global engine 334. Global engine 334 outputs to a loop buffer 336 and from loop buffer 336 the data flows to an output device driver 338. From output device driver 338, data can be output on an output device (not shown) interfacing with kernel section 390.

Data can also be received from an input device (not shown) via an input device driver 320. Input device driver 320 outputs to a loop buffer 322. Loop buffer 322 submits data to a global engine 324 which in turn outputs to a buffer 326. Buffer 326 outputs to a local engine 328 which in turn outputs to a buffer 331. Audio data is captured from buffer 331 at a SAC 333 and is returned to RTC 302 from SAC 333.

FIG. 4 shows an environment 400 that presents a variation on the environment 300 of FIG. 3 in which SAR 304 outputs directly to SAC 305 for a return of data to RTC 302. In environment 400 audio data is captured at SAC 305 before a format conversion at 308. Thus, audio data is directly acquired from SAR 304 via SAC 305. Before entering the local area, the process seen in environment 400 reduces the steps of the process seen in environment 300 in that the audio data that is being fed back to RTC 302 has avoided a format conversion and a sampling rate conversion, respectively, at reference numeral 308 and 330. In other respects, environment 400 is similar to environment 300.

FIG. 5 shows an environment 500 that is a variation on the environments 300, 400 of FIGS. 3, 4. Environment 500 shows a splitter 303 receiving audio data from RTC 302. Splitter 303 outputs to both SAR 304 and SAC 305. As such, FIG. 5 differs from FIG. 4 in that audio data is captured by SAC 305 before the rendering process at SAR 305. In other respects, FIG. 5 depicting environment 500 is similar to environments 300 and 400.

Figure 6:
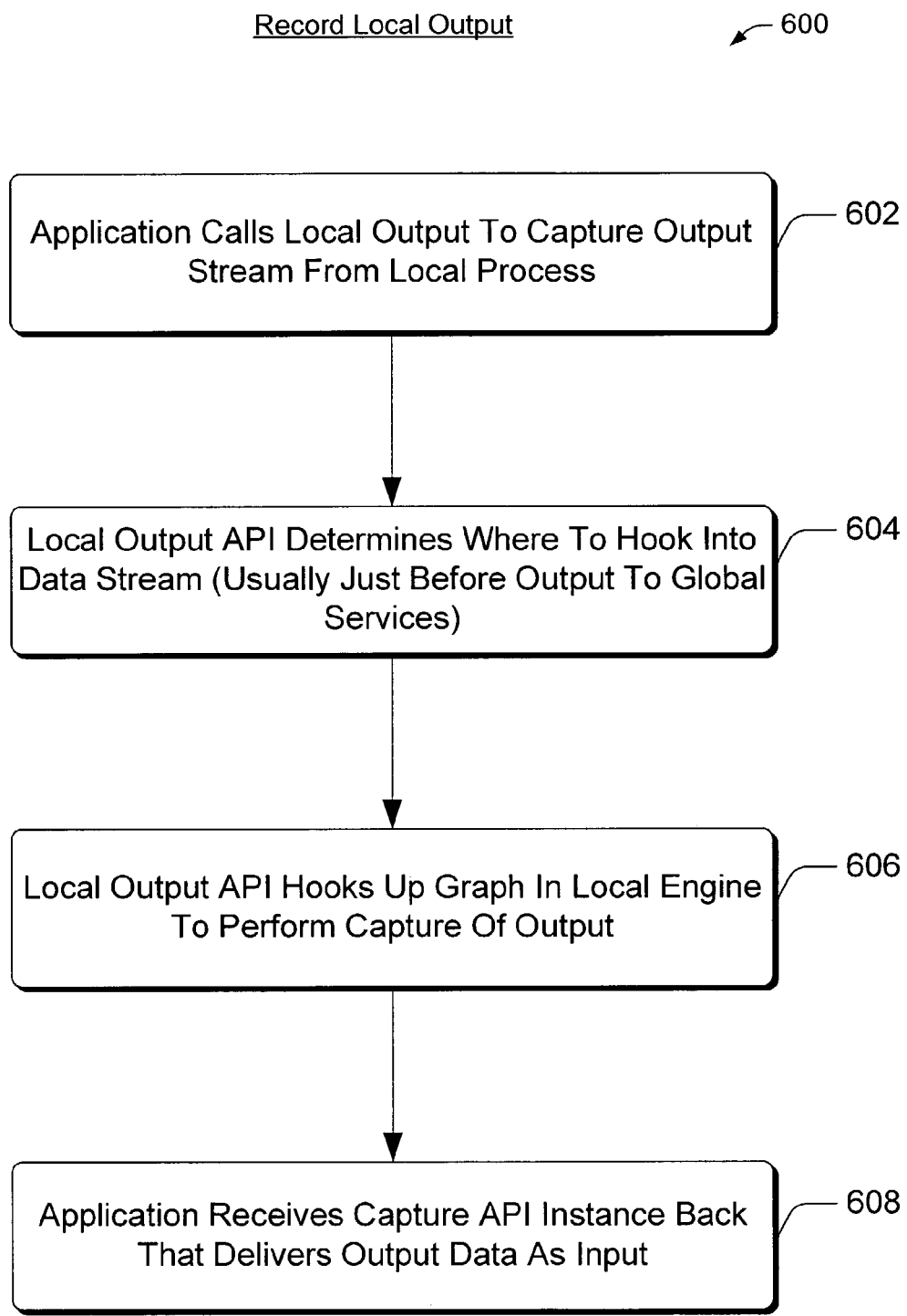
FIG. 6 shows a flow chart illustrative of a process in which an application calls for the opening of a SAC on its output to cancel the output and then pass the result back to the application.

FIG. 6 is a flowchart for a method 600 that is applicable to environments 300, 400, and 500 respectively in FIGS. 3-5. Method 600 enables the recording of the output from a local process. In method 600, an application, such an RTC, is canceling only the output from a local process rather than canceling the output from the local process from all of the global output. The application calls for a SAR to be opened on an output device as well as for a SAC to be opened on an input device. As such, the application requests an output device to be opened with a SAR interface and an input to open with an SAC interface.

Method 600 begins at a block 602 where the application calls for the capturing of an output stream from a local process. At a block 604, which follows block 602, a local output application program interface (API) determines where to hook into a data stream. This connection or hook is usually just before the local output is directed to global services. Following block 604, method 600 moves control to a block 606 at which the local output API hooks up an audio system graph in a local engine in order to perform a capture of an output stream. Following block 606, a block 608 is executed in method 600. At block 608, the application receives a capture API instance back and delivers output data as input to the application.

Figure 7:
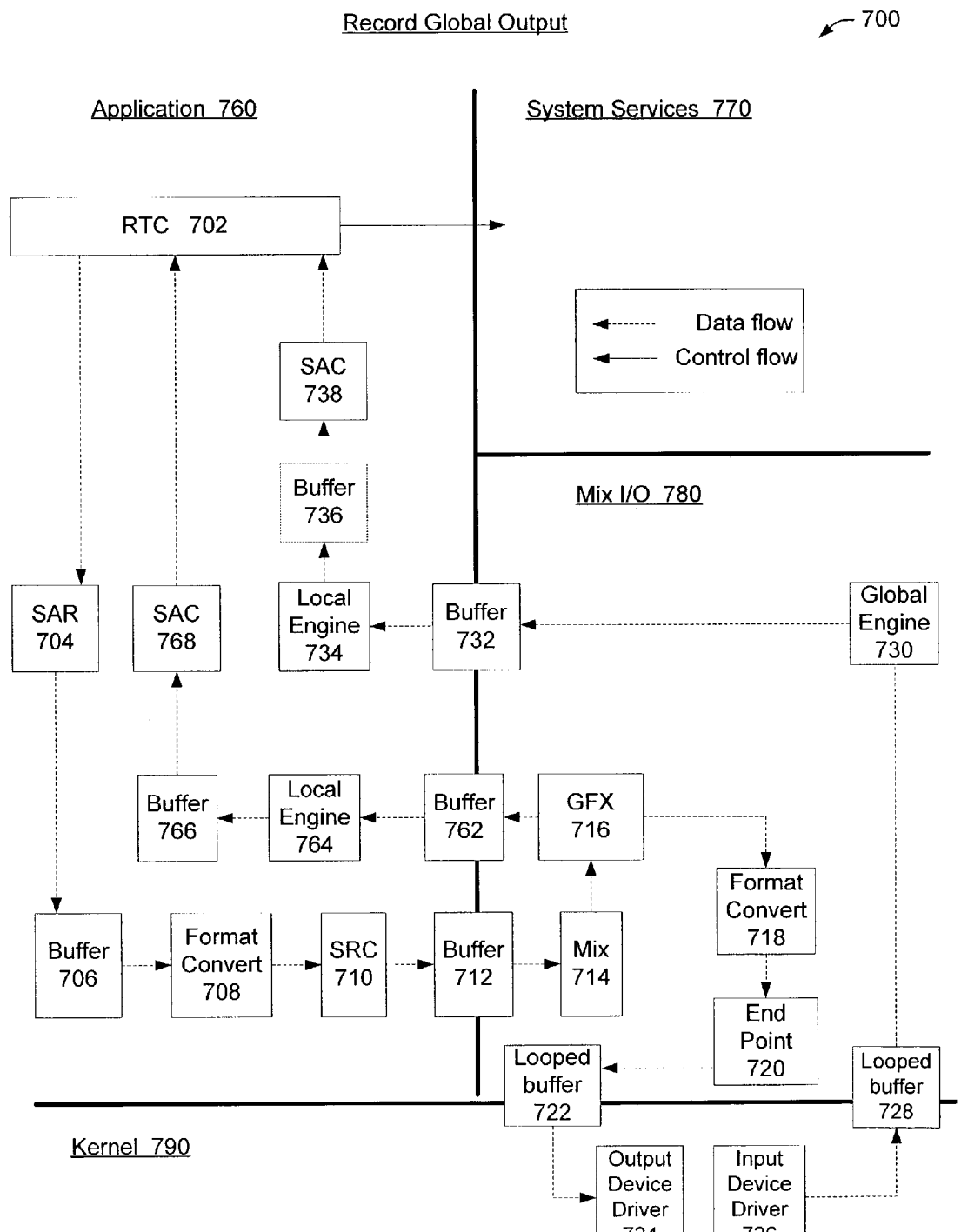
FIGS. 7 shows an implementation in which an RTC application is executing in a computer system having an operating system with a SAR open on an output device and a SAC open on an input device, where acoustic echoes are cancelled from the global output by the opening of a SAC on the output device.

FIG. 7 shows an environment 700 similar to environment 300 in FIG. 3 with the exceptions noted below. In environment 700 an RTC 702 is in a digital loop back circuit between an output device in communication with an output device driver 724 and an input device in communication with an input device driver 726. Environment 700 shows several sections that are delimited by the darker lines and include an application section 760, a system audio services section 770, a mix input/output (I/O) section 780, and a kernel section 790. Application section 760 is serviced by systems services section 770. Mix I/O section 780 receives input from an input device and outputs to an output device via respective drivers 724, 726. In environment 700, RTC 702 is performing signal processing (e.g. AEC) on the mix of audio streams in a global output to an output device by opening a streaming audio capturer on the output device.

RTC 702 has a SAR 704 open on output device driver 724 and a SAC 738 open on input device driver 726. In FIG. 7, solid lines reflect the flow of control and dashed lines indicate data flow. The control flow begins when the system audio service 770 receives a control flow instruction from RTC 702 to begin the process illustrated in environment 700. During this control flow, RTC 702 makes a request of the system audio service 770 to open up an output with an interface to a SAC 768. The RTC 702 uses the system audio service 770 to set up the SAR 704, the SAC 738, and the SAC 768. In this case, SAC 768 is the interface called by RTC 702. As such, RTC 702 has a data flow to SAR 704. SAR 704 outputs to buffer 706. Data flows from buffer 706 for a format conversion process at reference numeral 708. Following the format conversion at reference numeral 708, data flows to a sample rate converter (SRC) 710. SRC 710 is the last acoustic effect module seen in FIG. 7 before data flows to Mix I/O section 780. Effects other the SRC 730 are contemplated, including a volume mix down, a channel mix down, etc.

At SRC 710, the data is subject to a sample rate conversion and output to a buffer 712. Data flows from buffer 712 into mix I/O section 780 and to a mixer module 714. Various audio streams from various sources can be mixed together at mixer module 714. From mixer module 714, data flows to a global effects module (GFX) 716. At GFX 716, data flows in two different directions. In one of these directions, data flows from GFX 716 and is output to format conversion module 718 and then to an end point 720. From end point 720, data flows to a looped buffer 722 and from there to the output device driver 724. From output device driver 724, data can be output on an output device (not shown) interfacing with kernel section 790. In the other direction, data flows from GFX 716 to a buffer 762 and back into the application section 760 such that the data flows to a local engine 764. From local engine 764, the data flows to buffer 766 and then to SAC 768. At SAC 768, data is captured and returned to RTC 702 as an input. As such, RTC 702 has received the global output that has been captured from an output device.

Data can also be received from an input device (not shown) via an input device driver 726. Input device driver 726 outputs to a loop buffer 728. Loop buffer 728 submits data to a global engine 730 which in turn outputs to a buffer 732. Buffer 732 outputs to a local engine 734 which in turn outputs to a buffer 736. Audio data is captured from buffer 736 at a SAC 738 and is returned to RTC 702 from SAC 738.

FIG. 7 depicts the recording of a global output for use by the RTC 702 that is provided with access to the global output. This is accomplished by the RTC 702 calling for a capture stream to be opened on a playback device using an operating system capture service. When so opened, the global output is captured from an output device so the RTC 702 can performed signal processing techniques upon the global output, for example, AEC. Several application program interfaces (API) are used by RTC 702, including the SAR 704, the SAC 768, and the SAC 738. The SAR 704 is for rendering streaming audio data on an output device. The SAC 768 is for streaming audio data from a capture device. SAC 738 performs a similar function to SAC 768. When SAC 768 is opened on the output device with which output device driver 724 communicates, RTC 702 gains access to a digital loop back path. The global output can thereby be presented to RTC 702 as if audio data was being captured from an actual audio device. As such, the environment 700 enables a sound recording application, such as RTC 702, to easily capture all sounds regardless of the output device.

The input device (not shown) interfaces with input device driver 726, the RTC 702 has an output device open via output device driver 724 with an interface to SAR 704, and the RTC 702 also has an input device open via input device driver 726 to SAC 738. As such, RTC 702 is able to cancel acoustic echoes from the global output. Of course, environment 700 can perform other forms of advanced signal processing other than acoustic echo cancellation by using operating system services to open a capture source from an output device. Accordingly, local clients (e.g., applications) can thereby obtain access to the global output in order to perform signal processing.

Figure 8:
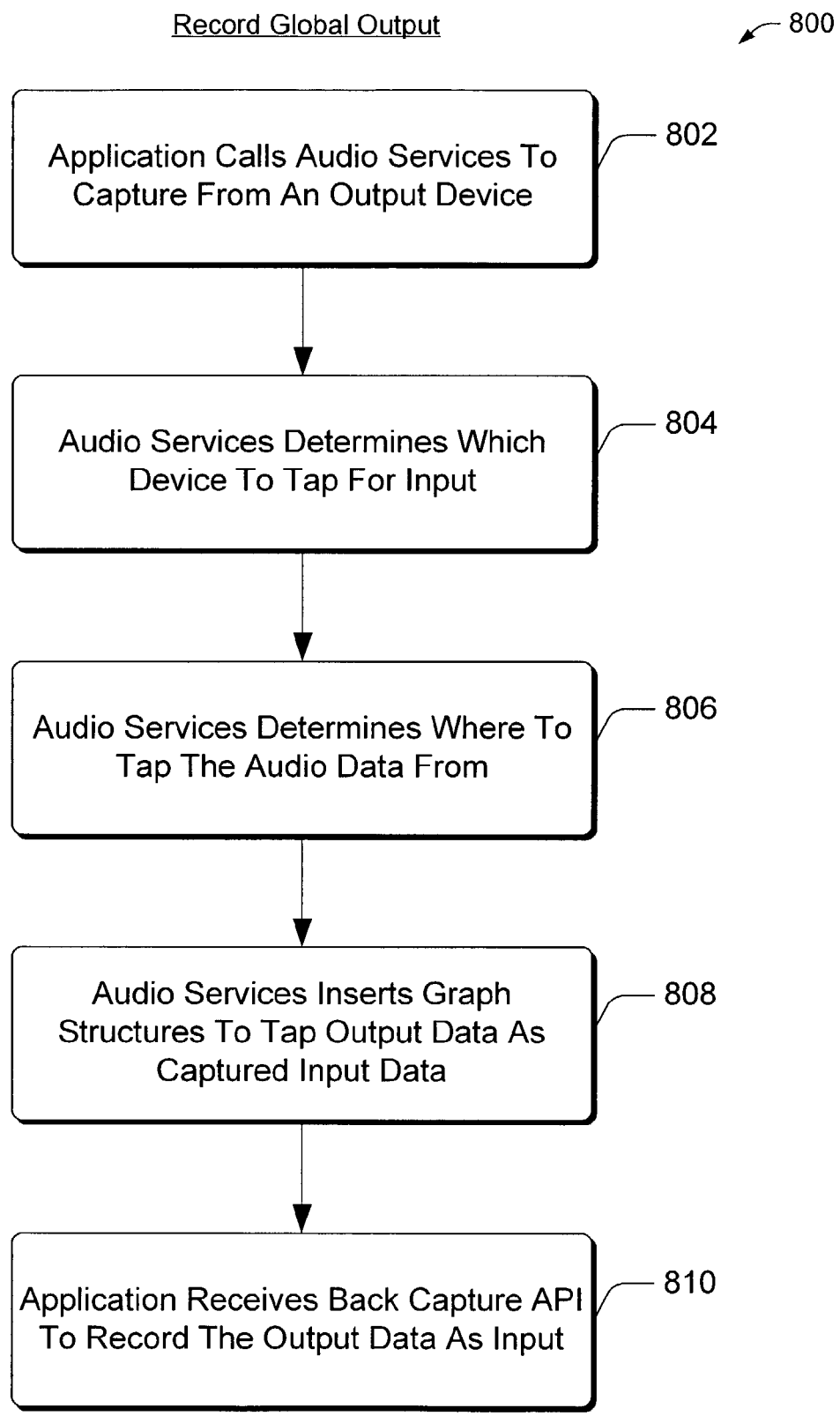
FIG. 8 shows a flow chart illustrative of a process in which an application calls for the opening of a SAC on an output device so as to capture the global output therefrom, and where the captured global output is returned to the application for further processing.

FIG. 8 shows a method 800 in which an application is able to get a global output using the capture services of the system audio services of an operating system. Method 800 begins at block 802 where the application calls audio services to capture an audio stream from an output device. Method 800 then moves to block 804 where the audio service determines which output device to tap into in order to receive input. Method 800 then moves to block 806. When control is passed to block 806, the audio service determines where to tap the audio data from. Control then passes to block 808 where the audio services then inserts structures for an audio system graph in order to tap the output data that is to be captured. Once captured, the output data will then be used as input data to the application for signal processing. Control of method 800 passes to block 810 where the application receives back the capture API in order to record the output data as input. As such, the application is able to receive the global output by using the capture services of the system audio services of an operation system. The application then can perform any of several signal processing techniques on the global output, including but not limited to AEC.

Exemplary Computing System and Environment

Figure 9:
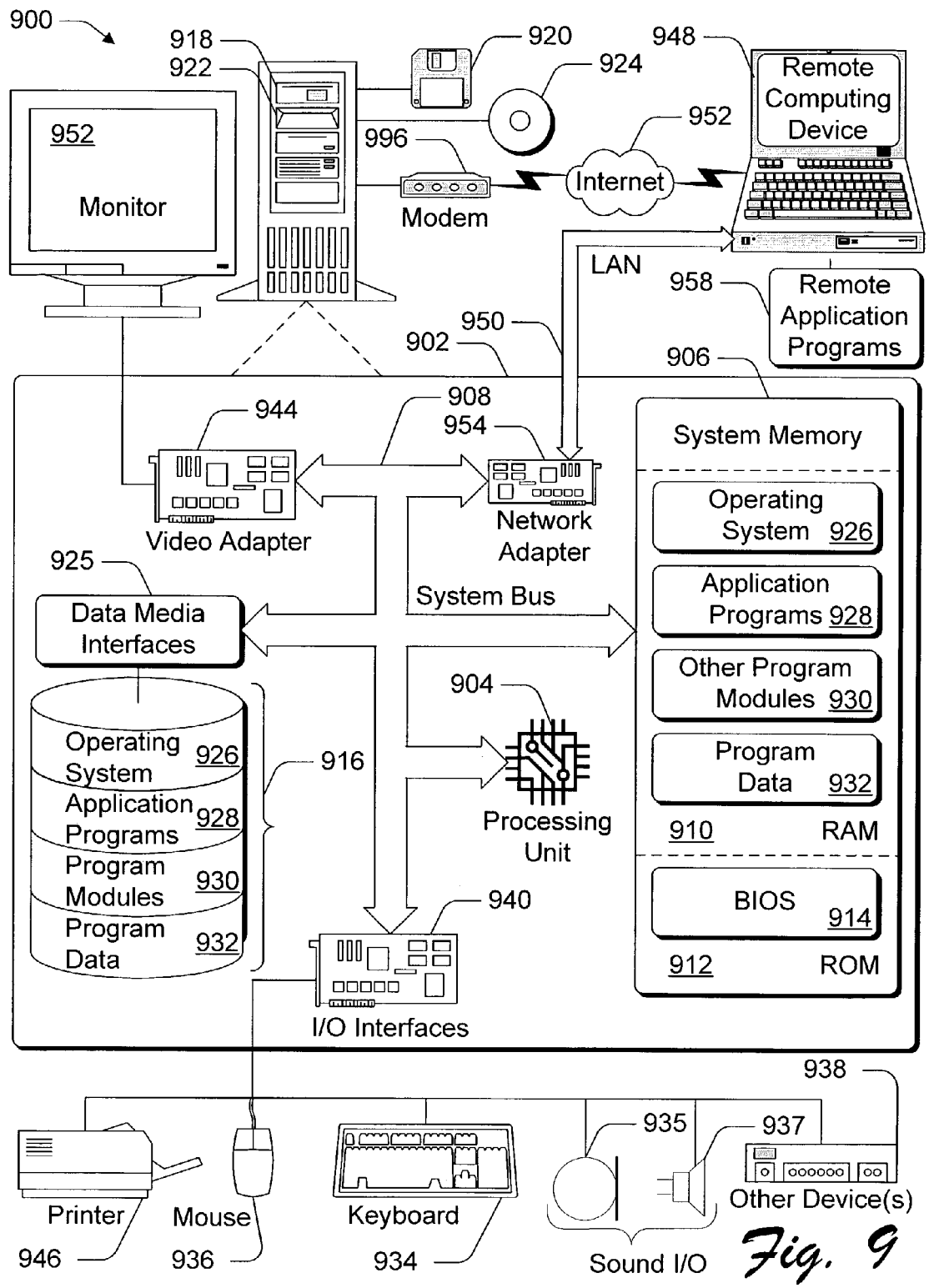
FIG. 9 illustrates an example of a computing environment within which the computer, network, software applications, methods and systems described herein can be either fully or partially implemented.

FIG. 9 illustrates an example of a computing environment 900 within which the applications, including the RTC and the MP, described herein can be either fully or partially implemented. Exemplary computing environment 900 is only one example of a computing system and is not intended to suggest any limitation as to the scope of use or functionality of the network architectures. Neither should the computing environment 900 be interpreted as having any dependency or requirement relating to any one or combination of components illustrated in the exemplary computing environment 900.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, mini-computers, mainframe computers, gaming consoles, distributed computing environments that include any of the above systems or devices, and the like.

The applications (including the RTC and the MP) may be described in the general context of computer-executable instructions, such as program modules, being executed by a computer. Generally, program modules include routines, programs, objects, components, data structures, etc. that perform particular tasks or implement particular abstract data types. The applications (including the RTC and the MP) may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing system in the form of a computer 902. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 902 typically includes a variety of computer readable storage media. Such media can be any available media that is accessible by computer 902 and includes both volatile and non-volatile media, removable and non-removable media. The system memory 906 includes computer readable storage media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by a SCSI interface (not shown).

The disk drives and their associated computer-readable storage media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable storage media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of the RTC and/or MP disclosed herein. Operating system 926 can include the standard operating system streaming audio capture and render services described above (SAC and SAR). Using these services of operating system 926, a client application, such an RTC, a MP, etc., is able to get a global audio output system-wide mix for signal processing.

Computer system 902 can include a variety of computer readable storage media identified as communication media. Communication media typically embodies computer readable instructions, data structures, program modules, and includes any information delivery media.

A user can enter commands and information into computer system 902 via input devices such as a keyboard 934 and a pointing device 936 (e.g., a "mouse"). A microphone 935 can be used to input vocal command that can be subject to a voice recognition process for passing on the vocal input. Other input devices 938 (not shown) can include a joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. Input/output interfaces 940 can include a sound card, an integrated (e.g., on-board) sound card, etc. One or more speakers 937 can be in communication with input/output interfaces 940. In addition to the monitor 942, other output peripheral devices can include components such as a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

A client application can be provided with access to a global audio output by opening a capture stream on a playback device using audio capture services of an operating system. In so doing, the client application is capturing the global output from an output device such as an audio device. Once captured, the client application can perform signal processing techniques (e.g., AEC) upon the captured global output. Additionally, these capture services can be called by the client application to open on an already existing rendering API such that only the output audio mix from the client application will be captured for further signal processing by the client application. For instance, the client application can then perform cancellations from just its own output rather than performing cancellations from all of the global output.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing system comprising:
    an operating system in communication with a speaker and a microphone, the operating system including a streaming audio capturer (SAC) and a streaming audio renderer (SAR), the operating system executing applications including a media player application (MP), wherein:
    the MP outputs a media audio stream to the SAR that renders the same to the speaker for an output that is then input to the microphone;
    the operating system outputs a system sounds audio stream to the SAR that renders the same to the speaker for an output that is then input to the microphone;
    the microphone receives an input of an ambient audio stream that comprises:
        the system sounds audio stream output by the speaker;
        the media audio stream output by the speaker; and
        a voice audio stream comprising vocal commands from a user for operations to be carried out by the MP;
    the MP performs a method comprising:
        calling for the SAC to capture from the renderings of the SAR: a local audio stream, the local audio stream comprising the media audio stream; and a global audio stream, the global audio stream comprising the system sounds audio stream; and the media audio stream;
        canceling from the input to the microphone: using the local audio stream captured by the SAC, the input of the media audio stream, whereby the media audio stream is prevented from being output more than once by the speaker; and
        using the global audio stream captured by the SAC, the input of the system sounds audio stream and the media audio stream, whereby the MP receives only the voice audio stream.

2. One or more computer-readable storage media having computer-readable instructions thereon which, when executed by the computing system, implement a method, the method comprising:
    executing a plurality of applications by an operating system, the applications comprising at least a streaming audio capturer (SAC), a streaming audio renderer (SAR), and a media player application (MPA);
    outputting by the MPA a media audio stream to the SAR, the SAR rendering the media audio stream to a speaker for an output that is then input to a microphone;
    outputting by the operating system a system sounds audio stream to the SAR, the SAR rendering the system sounds audio stream to the speaker for an output that is then input to the microphone;
    receiving by the microphone an input of an ambient audio stream that comprises:
        the system sounds audio stream output by the speaker;
        the media audio stream output by the speaker; and a voice audio stream comprising vocal commands from a user for operations to be carried out by the MPA;

wherein the MPA performs a method comprising:

calling for the SAC to capture from the renderings of the SAR:

a local audio stream that comprises the media audio stream; and a global audio stream that comprises:

the system sounds audio stream; and the media audio stream;

canceling from the input to the microphone using the local audio stream captured by the SAC, the input of the media audio stream, whereby the media audio stream is prevented from being output more than once by the speaker; and using the global audio stream captured by the SAC, the input of the system sounds audio stream and the media audio stream, whereby the MPA receives only the voice audio stream.

* * * * *